W. F. REULMANN.
INSOLE TACK PULLING MACHINE.
APPLICATION FILED MAR. 30, 1908.
912,730.
Patented Feb. 16, 1909.
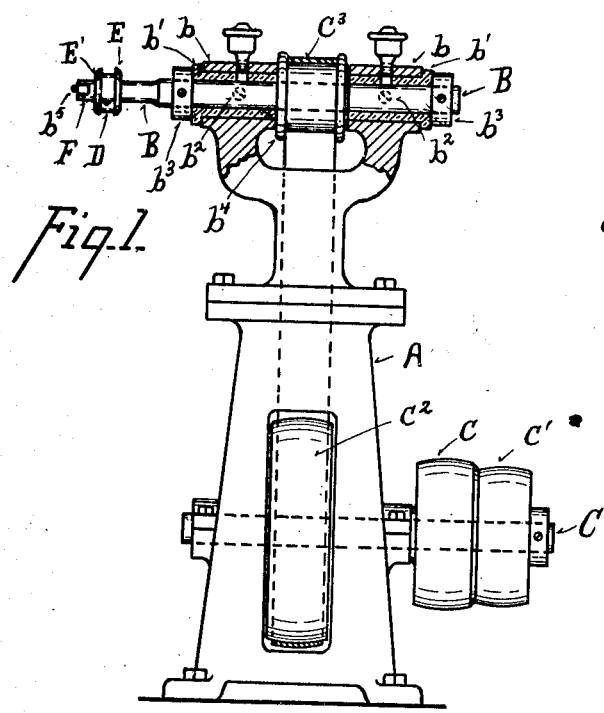
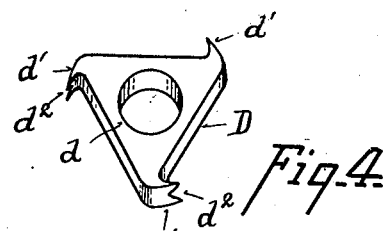
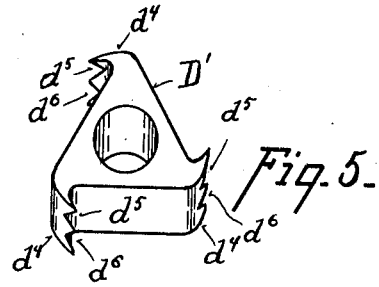
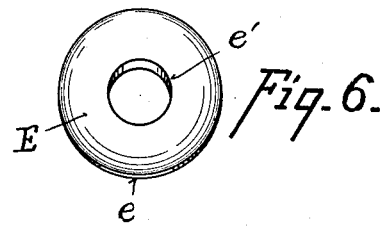
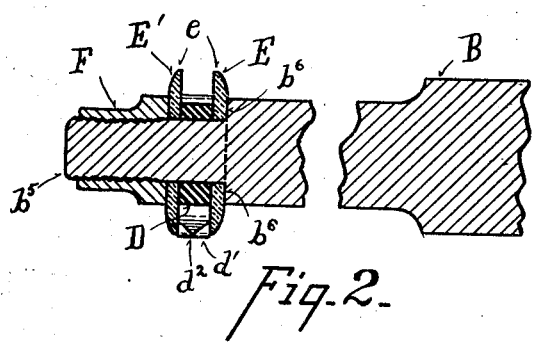
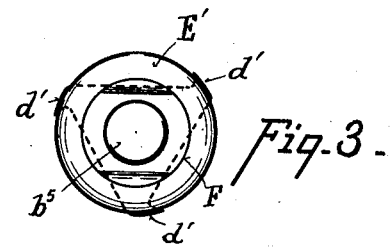
Witnesses
A. Orendoff
A. McCormack
Inventor
William F. Reulmann
By C. W. Miles.
Attorney

UNITED STATES PATENT OFFICE.

WILLIAM F. REULMANN, OF CINCINNATI, OHIO.

INSOLE-TACK-PULLING MACHINE.

No. 912,730.    Specification of Letters Patent.    Patented Feb. 16, 1909.

Application filed March 30, 1908. Serial No. 423,984.

*To all whom it may concern:*

Be it known that I, WILLIAM F. REULMANN, a citizen of the United States, residing at Cincinnati, in the county of Hamilton and State of Ohio, have invented certain new and useful Improvements in Insole-Tack-Pulling Machines, of which the following is a specification.

My invention relates to improvements in tack-pulling mechanism for shoemakers.

One of its objects is to provide a mechanism to rapidly extract the tacks or nails with which the inner-soles of shoes and boots are secured to the last, also the tacks or nails by which the uppers are attached to the inner-sole and last.

Another object is to provide mechanism for the above purpose, which is not liable to injure the leather in extracting the tacks.

Another object is to provide simple and efficient mechanism for the above purpose, which is not liable to injure the operator.

It further consists in certain details of form, combination and arrangement, all of which will be more fully set forth in the description of the accompanying drawings in which:

Figure 1 is a side elevation of a mechanism embodying my improvements, partly broken away. Fig. 2 is an enlarged central vertical section through the spindle and tack extractor. Fig. 3 is an end view of the parts shown in Fig. 2. Fig. 4 is a perspective view of the extractor member detached. Fig. 5 is a perspective view of a modification of the extractor member. Fig. 6 is a perspective view of one of the guard members detached.

In the accompanying drawings, A represents the frame of the machine, B represents the spindle which carries the tack extractor. Spindle B is mounted in journal boxes $b$, which are preferably provided with detachable sleeves $b'$, held in place by set screws $b^2$, said sleeves being detachable for the purpose of renewal when worn. Spindle B is preferably locked against endwise movement by collars $b^3$, and is provided with a pulley $b^4$.

C represents the main driving shaft provided with a tight pulley $c$, a loose pulley $c'$ and a pulley $c^2$ in line with pulley $b^4$ on the spindle, through which rapid motion is imparted to the spindle by means of a belt $c^3$ passing over pulleys $c^2$ $b^4$.

The projecting end $b^5$ of spindle B is reduced in diameter and threaded at the end, and a shoulder $b^6$ formed near the end. In the preferred form the extracting member D comprises a sleeve $d$ to closely fit the reduced end $b^5$ of the spindle, and one or more claws $d'$ arranged concentrically on said sleeve.

E E' represent guards having smooth narrow rims $e$ and concentrically bored at $e'$ to fit the end $b^5$ of the spindle. The claws of the extracting member project slightly beyond the edges of the guards and have V-shaped or converging notches $d^2$ in their forward edges. The extracting member is mounted upon the spindle with a guard member upon each side, and the three parts clamped rigidly on the spindle against the shoulder $b^6$ by means of a nut F.

In operation the spindle is rapidly rotated and the last and partly finished shoe pressed by the operator against the extractor and guards at the various points where tacks or nails are to be extracted. The guards prevent the extractor being forced deep enough into the leather to cut or injure the leather, and also force the leather downward away from the head of the tack, which is caught by the claws and withdrawn from the last and leather and thrown outwardly away from the operator.

In the modification Fig. 5, I have shown an extracting member D' of greater width than in Fig. 4, the claws $d^4$ of which are each provided with two V-shaped notches $d^5$ $d^6$. This form of extractor is to be employed as above described, and may be preferred by some operators to the form shown in Fig. 4.

The mechanism herein illustrated and described is capable of considerable modification without departing from the principle of my invention.

Having described my invention, what I claim is:

1. In a mechanism of the character indicated, a spindle, an extracting member mounted upon and adapted to rotate with said spindle and provided with a projecting notched claw adapted to engage and extract a tack, and an independent rotary guard member having a concentric periphery mounted on said spindle at one side of said extracting member.

2. In a mechanism of the character indicated, a rotary spindle, a member provided with one or more V-shaped claws adapted to extract a tack, and a pair of separable guard members having smooth concentric peripheral faces, said extracting member being rigidly clamped to said spindle between said guard members and adapted to rotate with said spindle.

3. In a mechanism of the character indicated, a rotary spindle, a rotary extracting member carried by said spindle and having a projecting notched claw adapted to engage and extract a tack, and a plurality of separable rotary guards carried by said spindle and located upon opposite sides of said extracting member to engage the face of the work and limit the relative positions of the claw and work.

In testimony whereof I have affixed my signature in presence of two witnesses.

WILLIAM F. REULMANN.

Witnesses:
C. W. MILES,
A. McCORMACK.